United States Patent [19]

Uhlenhoff

[11] 4,422,157
[45] Dec. 20, 1983

[54] BINARY MOS SWITCHED-CARRY PARALLEL ADDER

[75] Inventor: Arnold Uhlenhoff, Emmendingen, Fed. Rep. of Germany

[73] Assignee: ITT Industries Inc., New York, N.Y.

[21] Appl. No.: 296,398

[22] Filed: Aug. 26, 1981

[30] Foreign Application Priority Data

Sep. 20, 1980 [DE] Fed. Rep. of Germany ....... 3035631

[51] Int. Cl.³ .............................................. G06F 7/50
[52] U.S. Cl. ..................................... 364/786; 364/784
[58] Field of Search ........................ 364/784, 786, 787

[56] References Cited

U.S. PATENT DOCUMENTS

| | | | |
|---|---|---|---|
| 3,454,751 | 7/1969 | Brastins et al. | 364/784 |
| 3,717,755 | 2/1973 | Briley | 364/786 |
| 3,843,876 | 10/1974 | Fette et al. | 364/786 |
| 4,071,905 | 1/1978 | Oguchi et al. | 364/784 |

*Primary Examiner*—Jerry Smith
*Attorney, Agent, or Firm*—John T. O'Halloran; Alfred C. Hill

[57] ABSTRACT

A fast and inexpensive MOS switched carry parallel full adder is disclosed. Each stage includes only one inverter and two shunting transistors for the carry signal, one transistor being of the depletion type. Each stage further includes two EXCLUSIVE-OR gates and two NOR gates.

6 Claims, 2 Drawing Figures

BINARY MOS SWITCHED-CARRY PARALLEL ADDER

BACKGROUND OF THE INVENTION

The present invention relates to parallel adders and more particularly to binary MOS switched-carry parallel adders.

In a book by A. Shah et al, "Integrierte Schaltengen in digitalen Systemen", Vol. 2, Basel, 1977, switched-carry parallel adders are described on pages 85 to 109 and particularly on pages 103 to 105. For the electronic changeover switch which switches the carry signals of the individual stages from stage to stage in response to the two output signals of the half-adder combining the digit signals, only an implementation with bipolar transistors is given which includes three such transistors, a diode, and three resistors. As for the implementation of the half-adders, which are only given in the form of block diagrams, reference is made to commercially available bipolar integrated circuits on pages 87 to 103 of the above book.

Direct application of the fundamental principles of conventional parallel adders, explained with reference to the aforementioned bipolar integrated circuits, to integrated circuits using insulated-gate field-effect transistors, i.e., to so-called MOS circuits, is not readily possible because MOS technology and bipolar technology differ widely in some respects.

SUMMARY OF THE INVENTION

An object of the present invention is to provide a switched-carry parallel adder of the above-mentioned type which can be implemented using MOS technology.

Another object of the present invention is to provide the carry signal of each stage at the highest possible switching speed in MOS technology, i.e., the path for the carry signal must not contain more than one logic-circuit block per stage. A further object of the present invention is to reduce the amount of circuitry required for each stage so that thanks to the small cell area of a parallel-adder stage, optimum use can be made of the area available on the semiconductor body of the integrated circuit.

A feature of the present invention is the provision of a monolithic integrated n-stage parallel adder for two numbers each represented in an n-digit binary code, where n is an integer greater than one, each stage of the adder employing enhancement-mode insulated-gate field-effect transistors of the same conductivity type and having a carry signal switched therethrough by an electronic changeover switch, each of the n+stages comprising: a first EXCLUSIVE-OR block including a first AND gate having two inputs each receiving a different one of an associated digit of the two numbers, a second AND gate having two inputs each receiving a different one of an inverse of the associated digit of the two numbers and a first NOR gate having two inputs each coupled to an output of a different one of the first and second AND gates; a second EXCLUSIVE-OR block including third and fourth AND gates each having a first input coupled to the output of the first NOR gate and a second input coupled to a carry signal output of the next lower-order stage of the n+stages and a second NOR gate having two inputs each coupled to an output of a different one of the third and fourth AND gates to provide a sum signal for its associated one of the n+stages; an ON/OFF transistor switch or the changeover switch having its controlled current path coupled between the output of an inverter coupled to the carry signal output of the next lower-order stage of the n+stages and a carry signal output of the associated one of the n+stages and a gate coupled to the output of the first NOR gate, the inverter in the lowest-order stage of the n+stages being replaced by a NAND block to combine the associated digits of the two numbers; a first switching transistor having its controlled current path coupled between the carry signal output of the associated one of the n+stages and a first terminal of a power supply; a second, depletion mode switching transistor having its controlled current path coupled between the carry signal output of the associated one of the n+stages and a second terminal of the power supply; a first NOR block having two inputs each receiving a different one of the associated digits of the two numbers and an output coupled to a gate of one of the first and second switching transistors; and a second NOR block having two inputs each receiving a different one of the inverse of the associated digit of the two numbers and an output coupled to a gate of the other of the first and second switching transistors.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

In the following description, the binary signals are assumed to be processed in positive logic.

In the figures, the representation by means of logic symbols is chosen so that only those logic-circuit blocks have a load resistor which are marked with a point at the output to denote that inversion occurs. For this reason, for the purposes of the present description, a distinction is made between a logic-circuit block, which represents such a circuit with a single load resistor, and a logic gate, which forms part of a logic-circuit block.

Figure 1:
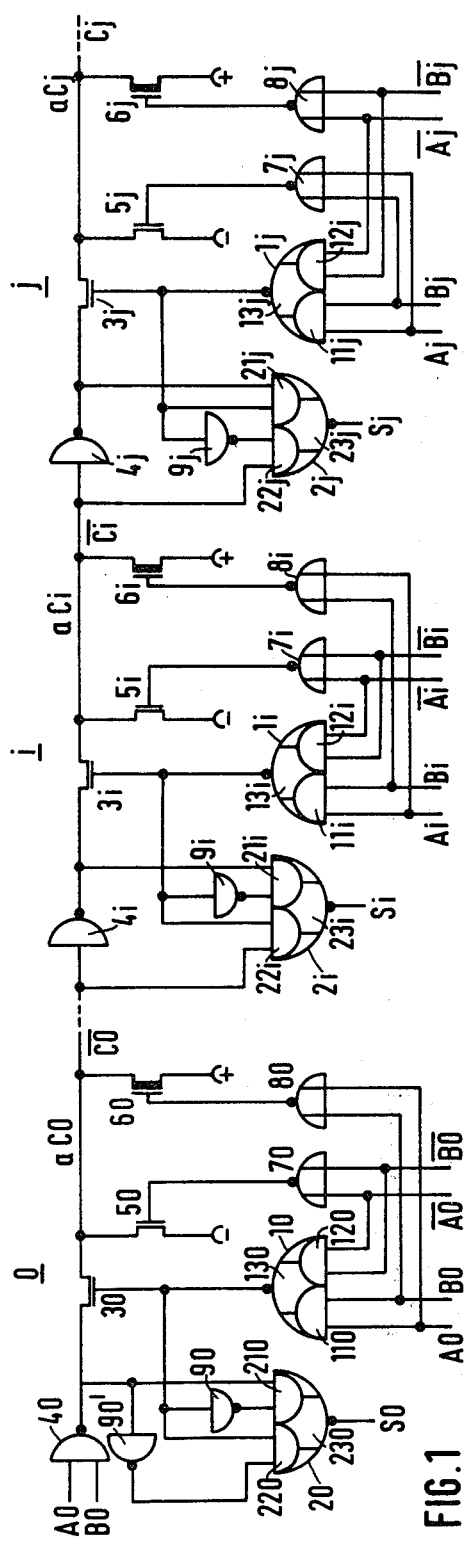
FIG. 1 is a circuit diagram of an embodiment of the parallel adder in accordance with the principles of the present invention showing the stage O, which processes the digit signals with the lowest weighting value $2°$, and the successive stages i, j, of an n-stage circuit.

In FIG. 1, stage j contains a first EXCLUSIVE-OR block $1j$ and a second EXCLUSIVE-OR block $2j$. Each of the blocks $1j$ and $2j$; include first and second AND gates $11j$, $12j$ and $21j$, $22j$, respectively, and NOR gates $13j$ and $23j$, respectively. The first and second EXCLUSIVE-OR blocks $1i$, $2i$ and $10$, $20$ of stages i and o, respectively, are of the same construction. The corresponding first AND gates are designated $11i$, $22i$, $110$, $210$, the respective second AND gates are denoted by $12i$, $22i$, $120,220$ and the NOR gates are designated $13i$, $23i$, $130,230$.

Stage j also contains a first NOR block $7j$ and a second NOR block $8j$. Corresponding NOR blocks are contained in stages i and o, where they are designated $7i$, $8i$ and $70$, $80$, respectively.

The digit signals Aj, Bj are applied to the two inputs of the first AND gate $11j$ of the first EXCLUSIVE-OR block and to both inputs of the first NOR block $7j$, and the inverse digit signals $\overline{Aj}$, $\overline{Bj}$ are applied to the two inputs of the second AND gate $12j$ of the first EXCLUSIVE-OR block $1j$ and to both inputs of the second NOR block $8j$. In stage j, these digit signals carry the weighting value $2^j$.

Furthermore, stage j includes a transistor $3j$, which is used as an ON/OFF switch and replaces the prior art electronic changeover switch during carry generation. The transistor $3j$ has its controlled current path connected between the output of an inverter $4j$, which follows the carry output aCi of the next lower-order stage i, and the carry output aCj of its own stage j. The gate electrode of the transistor $3j$ is connected to the output of the first EXCLUSIVE-OR block $1j$. This output is also coupled to one of the two inputs of the second AND gate $22j$ of the second EXCLUSIVE-OR block $2j$ through an inverter $9j$, while the other input of the second AND gate $22j$ is connected to the input of the inverter $4j$. The two inputs of the first AND gate $21j$ of the second EXCLUSIVE-OR block $2j$ are connected, respectively, to the output of the first EXCLUSIVE-OR block $1j$ and to the output of the inverter $4j$.

Figure 2:
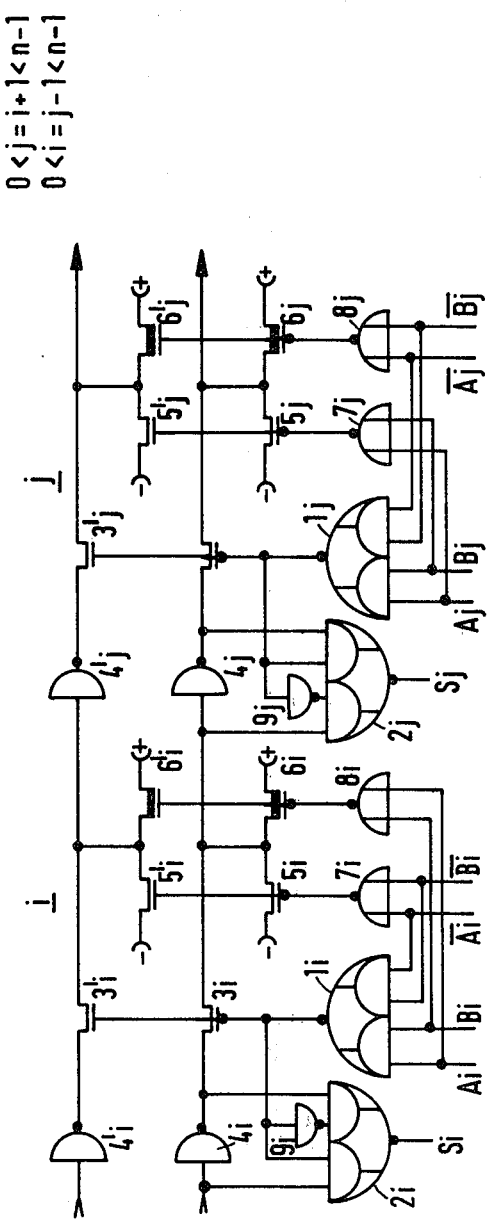
FIG. 2 is a circuit diagram of a multistage ($n > 5$) parallel adder in accordance with the principles of the present invention.

The carry output aCj of stage j is connected via the controlled current path of a first switching transistor $5j$ to the negative terminal of the power source—in FIGS. 1 and 2, N-channel transistors are assumed—and via a second, depletion-mode switching transistor $6j$ to the positive terminal of the power source. The gate of the first switching transistor $5j$ is connected to the output of the first NOR block $7j$, and that of the second switching transistor $6j$ is connected to the output of the second NOR block $8j$. The carry output aCj provides the carry signal Cj, and the output of the second EXCLUSIVE-OR block provides the sum signal Sj.

The next lower-order stage i is of the same construction as far as the logic-circuit blocks and the other components are concerned, but the control with the digit signals Ai, Bi, $\overline{Ai}$, $\overline{Bi}$ is slightly different from that in stage j, and the inverter $9i$ is associated with different gates. This is due to the fact that because of the inverter $4j$ between the carry outputs aCi, aCj of two stages, and when the transistor $3j$ and the switching transistors $5j$, $6j$ are conducting, the carry signal of the next lower-order stage, which is applied to the input of the inverter $4j$, is transferred to the carry output aCj in inverted form. This must be taken into account in the control of the individual logic-circuit blocks in the next lower-order stage. In FIG. 1 it is assumed that the carry signal Cj is present in uninverted form. Then, however, the carry signal of the next lower-order stage i is present in its inverted form $\overline{Ci}$.

Thus, in stage i, the digit signals Ai, Bi are applied not to the two inputs of the first NOR block $7i$—as is done in stage j, where they are applied to the two inputs of the first NOR block $7j$—but to the two inputs of the second NOR block $8i$. Unlike in stage j, see FIG. 1, where the output signal of the first EXCLUSIVE-OR block $1j$ is applied directly to one of the inputs of the first AND gate and, after being inverted by the inverter $gj$, to the inputs of the second AND gate of the second EXCLUSIVE-OR block $2j$, the output signal of the first EXCLUSIVE-OR block $1i$ of stage i is applied directly to one of the inputs of the second AND gate $22i$ and, after being inverted by the inverter 9, to one of the inputs of the first AND gate $21i$ of the second EXCLU-SIVE-OR block $2i$. The input of the inverter $4i$ must, therefore, be preceded by a stage whose output provides an uninverted carry signal, i.e., a stage whose construction corresponds to that of stage j.

As was assumed hereinabove, positive logic is employed, i.e., a more positive level H, is used for logic "1", and a more negative level, L, is used for logic "0". Thus, an H level is to appear at the respective carry output aCj only if either the next lower-order carry output aCi is at an L level and one of the two digit signals Aj, Bj is simultaneously at an H level, or the input of the inverter $4j$ and both digit signals Aj, Bj are at an H level.

In these cases, the transistor $3j$ causes this H level to be also transferred to the carry output aCj. However, since this transfer also takes place with input-signal combinations in which a carry signal is prohibited, the carry output aCj is clamped at the L level in these cases since the first switching transistor $5j$ is turned on by the output signal of the first NOR block $7j$.

In those cases where both digit signals Aj, Bj are at an H level, which alone results in an H level of the carry signal Cj, the second switching transistor $6j$ is immediately turned on by the output signal of the second NOR block $8j$ regardless of what happens in the remainder of stage j, so that the H level appears immediately at the carry output aCj. This is important in the case of higher-order digit signals but especially in the case of the most significant digit signal because, when the two binary numbers have a logic "1" in their most significant digits, the resulting carry appears only with a delay equal to the propagation time through the second NOR block $8j$.

Particularly important for the invention is also the inverter $4j$, which is indispensible with multidigit binary numbers because without it the carry signal from a lower-order stage would have lost so much in amplitude after a few stages that safe level sensing would no longer be possible. Hence, in the path for the carry signal there occurs only the propagation delay through one gate, namely, the inverter $4j$, and the switching delay of the transistor $3j$.

In the lowest-order stage O, which, as assumed hereinabove, has to process no carry signal, the inverters $4j$ and $4i$ of stages j and i are replaced by a NAND block 40, to which the uninverted digit signals AO, BO are applied. In the embodiment of FIG. 1, stage O, too, is a stage which provides the inverted carry signal $\overline{CO}$ at the carry output aCO. Analogously to the indices i, j in stages i, j, the components of stage O have an O as the last digit, i.e., stage O contains an ON/OFF transistor 30, a first switching transistor 50, a second, depletion-mode switching transistor 60, a first EXCLUSIVE-OR block 10, a second EXCLUSIVE-OR block 20, a first NOR block 70, a second NOR block 80, and an inverter 90. An additional inverter 90' applies the output signal of the NAND block 40 in inverted form to one input of the second AND gate 220 of the second EXCLUSIVE-OR block 20.

FIG. 2 shows a modification of the embodiment illustrated in FIG. 1. This modification will be of particular advantage with multidigit (n>5) parallel adders for the following reason. As is apparent from FIG. 1, the outputs of the NAND block 40 and of the inverters $4i$, $4j$ in the individual stages O,i,j are capacitively loaded with at least one input of another stage. This slows down the overall circuit, and this slowdown is disadvantageous especially with the aforementioned multidigit parallel adders, in which this delay adds up. To avoid this capacitive load, the embodiment of FIG. 2 includes an additional series branch which includes an additional inverter $4'i$, $4'j$ and an additional transistor $3'i$, $3'j$ in each stage i,j, and of an additional NAND block in the lowest-order stage O. The n series branches of the individual stages are connected in series in the direction of increasing n, and in each stage i,j, the gate of the additional transistor $3'i$, $3'j$ is connected to that of the transistor $3i$, $3j$. Furthermore, in each stage i,j, an additional first switching transistor $5'i$, $5'j$ and an additional second, depletion-mode switching transistor $6'i$, $6'j$ are connected, in the same direction as the first and second switching transistors $5i$, $6i$ and $5j$, $6j$, between the additional transistor $3'i$, $3'j$ and the input of the additional inverter $4'j$ of the next higher-order stage j. The end of the series-connected series branches forms the output for the carry signal for the highest-order stage n-1.

The MOS switched-carry parallel adder according to the present invention can be used to particular advantage in so-called multilevel parallel adders, which add several n-digit binary numbers, with only two binary numbers having to be added at the last level.

The construction of the individual stages i, j permits optimum utilization of the surface of the semiconductor body of the integrated circuit per stage, so that many such stages can be arranged in optimum fashion.

While I have described above the principles of my invention in connection with specific apparatus, it is to be clearly understood that this description is made only by way of example and not as a limitation to the scope of my invention as set forth in the objects thereof and in the accompanying claims.

I claim:

1. A monolithic integrated n-stage parallel adder for two numbers each represented in an n-digit binary code, where n is an integer greater than one, each stage of said adder employing enhancement-mode insulated-gate field-effect transistors of the same conductivity type and having a carry signal switched therethrough by an electronic changeover switch, each of said n+stages comprising:
   a first EXCLUSIVE-OR block including a first AND gate having two inputs each receiving a different one of an associated digit of said two numbers, a second AND gate having two inputs each receiving a different one of an inverse of said associated digit of said two numbers and a first NOR gate having two inputs each coupled to an output of a different one of said first and second AND gates;
   a second EXCLUSIVE-OR block including third and fourth AND gates each having a first input coupled to the output of said first NOR gate and a second input coupled to a carry signal output of the next lower-order stage of said n+stages and a second NOR gate having two inputs each coupled to an output of a different one of said third and fourth AND gates to provide a sum signal for its associated one of said n+stages;
   an ON/OFF transistor switch or said changeover switch having its controlled current path coupled between the output of an inverter coupled to said carry signal output of the next lower-order stage of said n+stages and a carry signal output of said associated one of said n+stages and a gate coupled to the output of said first NOR gate, said inverter in the lowest-order stage of said n+stages being replaced by a NAND block to combine said associated digits of said two numbers;
   a first switching transistor having its controlled current path coupled between said carry signal output of said associated one of said n+stages and a first terminal of a power supply;
   a second, depletion mode switching transistor having its controlled current path coupled between said carry signal output of said associated one of said n+stages and a second terminal of said power supply;
   a first NOR block having two inputs each receiving a different one of said associated digits of said two numbers and an output coupled to a gate of one of said first and second switching transistors; and
   a second NOR block having two inputs each receiving a different one of said inverse of said associated digit of said two numbers and an output coupled to a gate of the other of said first and second switching transistors.

2. A parallel adder according to claim 1, wherein said first terminal is negative with respect to said second terminal when said conductivity type is N-channel.

3. A parallel adder according to claim 1, wherein said first terminal is positive with respect to said second terminal when said conductivity type is P-channel.

4. A parallel adder according to claims 1, 2 or 3, wherein
each of said n+stages further includes
   at least one series branch having an additional inverter and an additional ON/OFF transistor switch coupled in series, said additional inverter in the lowest-order stage of said n+stages being replaced by an additional NAND block; and
   a gate of said additional ON/OFF transistor switch is connected to said gate of said ON/OFF transistor switch;
   each of said series branches being connected in series in the direction of increasing n and the end of said series connected series branches provides a carry signal output of the highest-order stage of said n+stages.

5. A parallel adder according to claim 4, wherein each of said n+stages further includes
   an additional first switching transistor and an additional second, depletion-mode switching transistor connected like said first switching transistor and said second switch transistor, said additional first and second switching transistors being connected between said additional ON/OFF transistor switch and said additional inverter of the next higher-order stage of said n+stages.

6. A parallel adder according to claim 5, wherein gates of said additional first and second switching transistors are connected to gates of said first and second switching transistors, respectively.

* * * * *